United States Patent [19]
Walker et al.

[11] Patent Number: 5,612,956
[45] Date of Patent: Mar. 18, 1997

[54] REFORMATTING OF VARIABLE RATE DATA FOR FIXED RATE COMMUNICATION

[75] Inventors: G. Kent Walker, Escondido; Paul Moroney, Olivenhain; Ray Nuber, La Jolla, all of Calif.

[73] Assignee: General Instrument Corporation of Delaware, Chicago, Ill.

[21] Appl. No.: 573,227

[22] Filed: Dec. 15, 1995

[51] Int. Cl.$^6$ .................................. H04J 3/22; H04J 3/26
[52] U.S. Cl. .......................... 370/545; 370/474; 370/506; 375/289; 348/465
[58] Field of Search .............................. 370/60, 60.1, 84, 370/79, 94.1, 94.2, 99, 102, 111, 112; 375/289; 348/461, 465, 467

[56] References Cited

U.S. PATENT DOCUMENTS

| | | | |
|---|---|---|---|
| Re. 35,104 | 11/1995 | Murakami et al. | 370/84 |
| 4,017,688 | 4/1977 | Callens et al. | 370/84 |
| 4,757,501 | 7/1988 | Gorshe | 370/99 |
| 5,343,468 | 8/1994 | Rau | 370/60 |
| 5,534,944 | 7/1996 | Egawa et al. | 370/94.1 |

OTHER PUBLICATIONS

"Interfaces for CATV/SMATV Headends and Similar Professional Equipment," Digital Video Broadcasting DVB Document A010, Oct. 31, 1995.

"American National Standard for Telecommunications—Digital Hierarchy—Electrical Interfaces," American National Standards Institute, Inc., T1.102–1987, Aug. 27, 1987, pp. 1–27.

*Primary Examiner*—Hassan Kizou
*Attorney, Agent, or Firm*—Barry R. Lipsitz

[57] ABSTRACT

Variable rate data is reformatted for communication to an external device at a fixed rate. Fixed length packets of the variable rate data are recovered from a multiplex of data packets. A packet start byte is added to the beginning of each of the recovered packets. Fill bits are added to the recovered packets as necessary to maintain the desired fixed output rate if the output rate is greater than an information rate of the variable rate data. The recovered packets with the added packet start byte and fill bits are provided as output to the external device at the fixed rate. The recovered packets with the added packet start byte and fill bits are advantageously encoded using alternate mark inversion (AMI) and binary eight zero substitution (B8ZS). The packet start byte and B8ZS substitution can comprise unique AMI violation sequences.

14 Claims, 2 Drawing Sheets

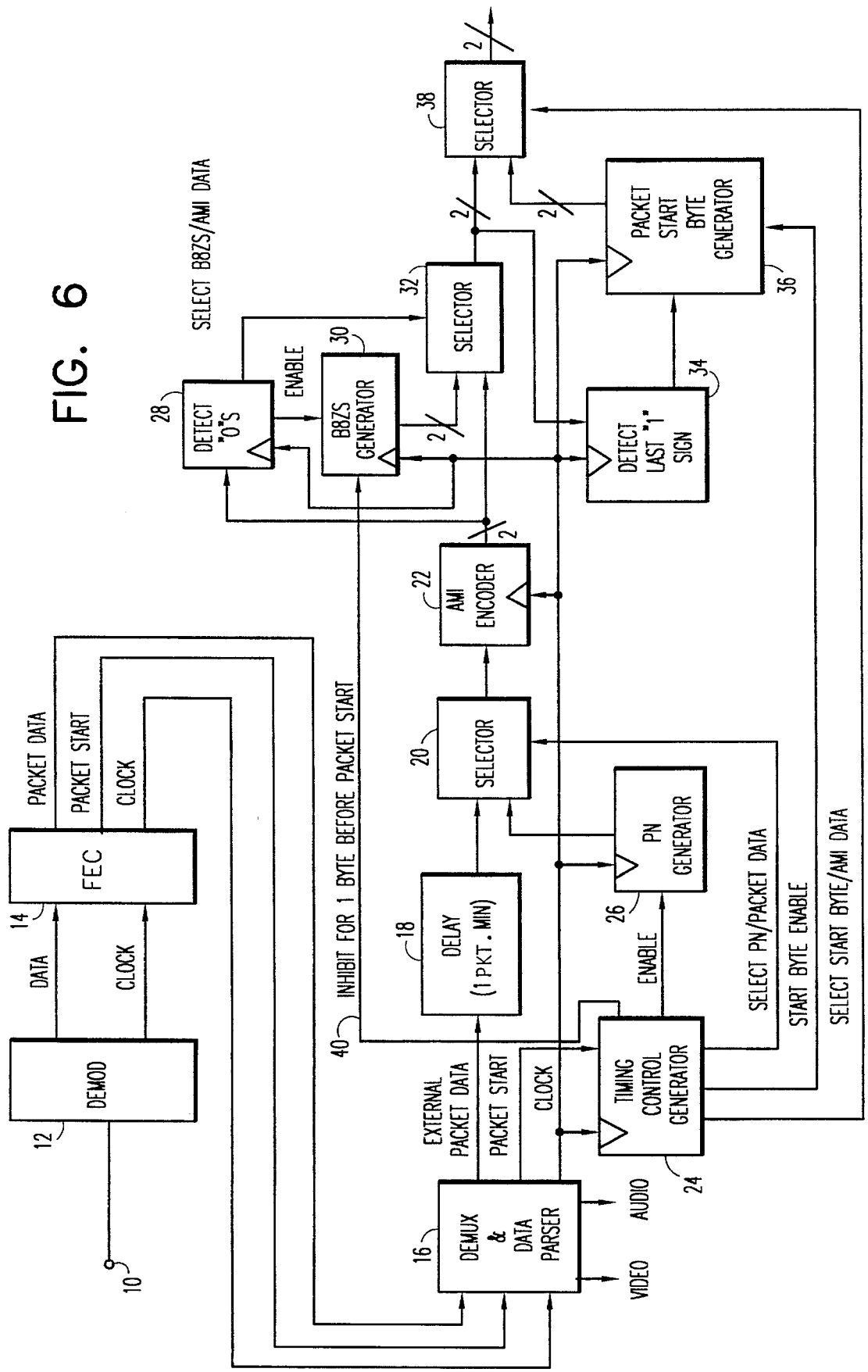

REFORMATTING OF VARIABLE RATE DATA FOR FIXED RATE COMMUNICATION

BACKGROUND OF THE INVENTION

The present invention relates to the reformatting of variable rate data for communication to an external device at a fixed rate. The invention has particular application in the provision of an extensible interface for a communications terminal such as a set top box or integrated receiver decoder (IRD) for digital television, in which the data stream received by the terminal carries data for use by an external device ("external data") in addition to television and access control signals.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. Examples of such schemes are the MPEG-2 data transmission standard and the DigiCipher® II standard proprietary to General Instrument Corporation of Chicago, Ill., U.S.A., the assignee of the present invention. The DigiCipher® II standard extends the MPEG-2 systems and video standards, which are widely known and recognized as transport and video compression specifications specified by the International Standards Organization (ISO) in Document series ISO 13818. The MPEG-2 specification's systems "layer" provides a transmission medium independent coding technique to build bitstreams containing one or more MPEG programs. The MPEG coding technique uses a formal grammar ("syntax") and a set of semantic rules for the construction of bitstreams. The syntax and semantic rules include provisions for demultiplexing, clock recovery, elementary stream synchronization and error handling. The syntax and semantics of the MPEG-2 transport stream are defined in International Organisation for Standardisation, ISO/IEC 13818-1, International Standard, 1994 entitled "Generic Coding of Moving Pictures and Associated Audio: Systems," recommendation H.222, incorporated herein by reference. It is expected that digital television transmitter and receiver systems will replace existing analog systems just as digital compact discs have largely replaced analog phonograph records in the audio industry.

An advantage of digital transmission techniques is that the television signals can be compressed using various well known compression techniques in order to free up bandwidth in the cable or satellite television spectrum. This bandwidth can be used to provide additional services, such as additional television channels and/or the communication of external data that may or may not be related to the television services. Currently, television, telephone, personal computer (PC) and other technologies are beginning to merge. In the interim, it is desirable to allow products using such technologies to communicate with one another through an efficient and low cost interface.

In particular, it would be advantageous to provide an external data interface port on "set top" boxes that receive television signals from satellite and cable television systems. Such an interface port would enable the communication of data which is carried with television program services but is independent of said services to external peripherals, such as a personal computer, video player/recorder, video game, or the like. It would be particularly advantageous if such an interface port provided for the communication of data to the external peripheral component at virtually any desired fixed rate. Moreover, it would be advantageous for such an interface to provide for the reformatting of variable rate data received from a cable or satellite television system into fixed rate data in an efficient and low cost manner.

The present invention provides an interface having the aforementioned and other advantages. In particular, the interface of the present invention allows output at a fixed rate no matter what the information rate. This feature enables a simple and inexpensive recovery circuit to be implemented using a simple and inexpensive connector, such as a miniature headphone jack or other well known connector. The circuit is also substantially free of electromagnetic interference (EMI). Data is carried over the interface in a differential mode, providing good noise immunity and a two wire interface that is not sensitive to wiring polarity. Since the information rate is independent of the receiver clock, which establishes the fixed output rate, the transmission rate can be used as a time reference. Thus, the external device can recover the clock very easily despite the variable information rate. Since no DC path is required between the connector and the chassis of the receiver, troublesome ground loops are eliminated. Additional advantages will be apparent from the following disclosure.

SUMMARY OF THE INVENTION

In accordance with the present invention, a method is provided for reformatting variable rate data for communication to an external device at a fixed rate. Fixed length packets of variable rate data are recovered from a multiplex of data packets, e.g., from an MPEG-2 or Digicipher II data stream. A packet start byte is added to the beginning of each of the recovered packets. If the information rate of the variable rate data is less than the fixed rate at which the data is communicated to the external device, fill bits are added to each of the recovered packets as necessary in order to preserve the fixed rate at which output data is provided to the external device. Although the number of fill bits will be related to the information rate of the variable rate data, it is not necessary to specify a fixed relationship between these items. Instead, a variable amount of fill can be used based on when a current packet requiring fill bits arrives and the operation of the hardware (e.g., first-in first-out register ("FIFO")) that temporarily holds the packet data and any fill bits prior to their being provided as output to the external device. As used herein, the "information rate" is the rate of the information carried by the variable rate data stream as opposed to the rate of all of the data in the variable rate stream which may also comprise, for example, parity bits for forward error correction. The recovered packets with the added packet start byte and any fill bits are provided as an output to the external device at the fixed rate.

The recovered packets can be encoded with the added packet start byte and fill bits prior to being output to the external device, using alternate mark inversion (AMI) and binary eight zero substitution (B8ZS) to provide an encoded data stream for output to said external device. The fill bits can comprise, for example, binary pseudo-noise (PN) fill bits. By using AMI encoding, clock information can be embedded in the data stream and a net zero DC component results. Moreover, AMI violations can be used for packet synchronization detection when the data stream is decoded, without the need for more wires at the interface. B8ZS encoding reduces DC drift and provides clearly recognizable transitions for clock recovery.

The fixed length packets recovered during the recovering step can comprise symbols received according to a multiphase and/or multilevel modulation format and decoded using a forward error correction (FEC) algorithm (e.g., the Viterbi algorithm) to obtain the variable rate data. In such an embodiment, the information rate will depend on a symbol rate of the symbols, the modulation format, and a coding rate of the FEC algorithm. Moreover, the packets can be recovered during the recovering step using a master clock frequency $f$. The recovered packets each contain a fixed number B of information bytes plus a fixed number R of parity bytes for error correction. The total length of each packet comprises B+R bytes, where each of said bytes is b-bits in length.

The packet start byte can comprise an AMI violation sequence. In particular, the violation sequence can comprise 0+0+−0−0 when the closest preceding binary "1" to the packet start byte in the AMI encoded data stream is encoded as an AMI "+" value. The violation sequence can comprise 0−0−+0+0 when the closest preceding binary "1" to the packet start byte in the AMI encoded data stream is encoded as an AMI "−" value. An AMI "+" value represents a positive differential output voltage, an AMI "−" value represents a negative differential output voltage, and an AMI "0" value represents a differential output of zero volts.

The B8ZS encoding can comprise the replacement of a string of eight zeros with an AMI violation sequence. In particular, the violation sequence used to encode the string of eight zeros can be +0−00−0+ when the closest preceding binary "1" to the string in the AMI encoded data stream is encoded as an AMI "+" value. The violation sequence used to encode the string of eight zeros can comprise −0+00+0− when the closest preceding binary "1" to the packet start byte in the AMI encoded data stream is encoded as an AMI "−" value.

Apparatus is provided for reformatting variable rate data for communication to an external device at a fixed rate. A decoder recovers fixed length packets of the variable rate data from a multiplex of data packets. An encoder adds a packet start byte to the beginning of each of the recovered packets. The encoder also adds fill bits to each of the recovered packets if the information rate of the variable rate data is less than the fixed rate at which the data is communicated to the external device. An output port coupled to the encoder provides the recovered packets with the added packet start byte and fill bits to the external device at the fixed rate.

In an illustrated embodiment, the encoder encodes the recovered packets with the added packet start byte and fill bits using alternate mark inversion (AMI) and binary eight zero substitution (B8ZS) to provide an encoded data stream for output to the external device. The fixed length packets recovered by the decoder can comprise symbols received according to a multiphase and/or multilevel modulation format and decoded using a forward error correction (FEC) algorithm to obtain the variable rate data. In such an embodiment, the information rate depends on a symbol rate of the symbols, the modulation format, and a coding rate of the FEC algorithm.

The apparatus can further comprise a master clock of frequency $f$ coupled to the decoder and the encoder. The recovered packets each contain a fixed number B of information bytes plus a fixed number R of parity bytes for error correction. The total length of each packet comprises B+R bytes, where each of the bytes is b-bits in length. Fill bits are added as necessary to maintain the desired output data rate, despite the variable information rate.

The packet start byte can comprise an AMI violation sequence. Further, the B8ZS encoding can replace a string of eight zeros with an AMI violation sequence.

BRIEF DESCRIPTION OF THE DRAWINGS

FIG. 6 is a block diagram of apparatus in accordance with the present invention.

DETAILED DESCRIPTION OF THE INVENTION

The present invention provides an interface for fixed rate data between a communications terminal (e.g., a set top satellite or cable television box) and an external device such as a PC, video disc player/recorder, video tape recorder, video game, or other consumer or commercial multimedia appliance. The invention is useful in providing an interface for data at any desired rate. In a particular implementation where the high speed data is carried in a DigiCipher II transport stream, the data rate is on the order of thirty megabits per second (Mbps). This "external data" can be advantageously output from an output port as a differential pair of signals. For example, a 0.5 volt peak-to-peak difference can be provided between the signals forming the differential pair.

In accordance with one embodiment of the invention, the external data output is encoded using alternate mark inversion (AMI) and is output most significant AMI encoded bit first. AMI encoding consists of translating a binary symbol set to a three level "ternary" symbol set by encoding binary zeros as zero voltage and binary ones alternately as positive and negative voltage values. AMI encoding is well known in the art of telemetry systems.

The external data is received at a variable rate and reformatted for communication to an external device at a fixed rate. The syntax of the fixed rate output is illustrated in Table 1.

TABLE 1

| | No. of Bits | Mnemonic |
|---|---|---|
| ext_data_sequence( ){ | | |
| for (i=0; i<N; i++){ | | |
| ext_data_packet( ) | | |
| } | | |
| ext_data_packet( ){ | | |
| pkt_start_byte | 8 | bslbf |
| packet | 188*8 | bslbf |
| fill | n | bslbf |
| } | | |

The terms used in Table 1 are defined as follows:

bslbf - binary string left bit first tslsf - ternary string left symbol first pkt_start_byte - an eight-bit packet start byte.

packet - a 188-byte MPEG-2 or DigiCipher II transport packet.

fill - an n-bit string of fill bits.

Each occurrence of the pkt_start_byte shall be one of two eight-AMI symbol sequences. Both of the sequences shall violate AMI encoding rules in that the voltage polarity of adjacent ones are identical after coding. In an example implementation, the pkt_start_byte patterns are as set forth in Table 2.

TABLE 2

|  | No. Bits | Mnemonic |
|---|---|---|
| packet_start_positive (){ 0+0+−0−0 | 8 | tslsf |
| packet_start_negative (){ 0−0−+0+0 } | 8 | tslsf |

"0" represents a differential output of zero volts,

"+" represents a differential output of +0.5 volts, and "−" represents a differential output of −0.5 volts.

Packet_start_positive is output when the binary one most recently output previous to the pkt_start_byte was encoded as a "+" symbol. Packet_start_negative will be output when the binary one most recently output previous to the pkt_start_byte was encoded as a "−" symbol.

Figure 1:
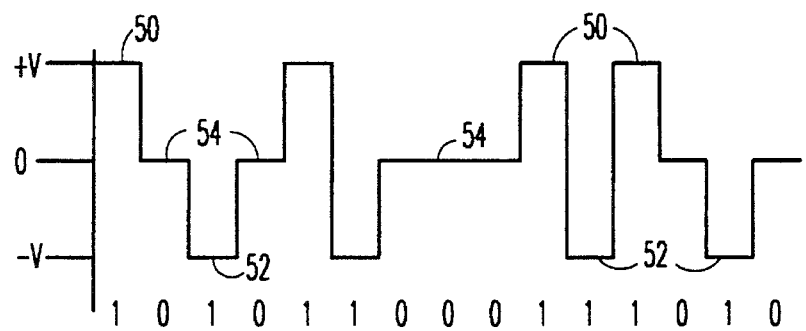
FIG. 1 is an example waveform showing an AMI sequence.

The AMI encoding process is illustrated in FIG. 1, which is a random example in which the bitstream 101011000111010 is AMI encoded. As shown in FIG. 1, each binary one is encoded as either a positive ("+") symbol 50 or a negative ("−") symbol 52. Alternating binary ones are encoded with opposite polarities, such that a positive symbol will never be adjacent another positive symbol and a negative symbol will never be adjacent another negative symbol. Zeros are all encoded the same, as indicated by reference numeral 54.

Figure 2:
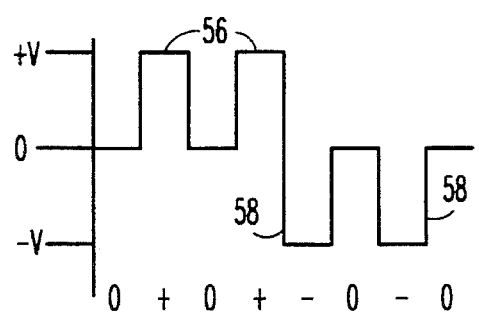
FIG. 2 is a waveform illustrating a first AMI violation sequence.
Figure 3:
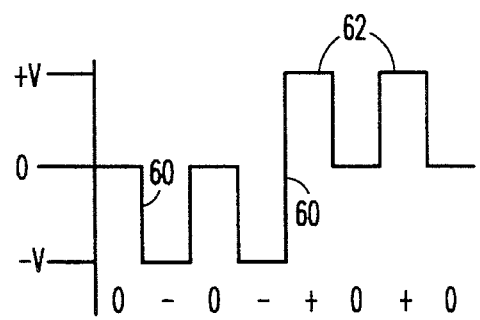
FIG. 3 is a waveform illustrating a second AMI violation sequence.

Whereas FIG. 1 illustrates proper AMI encoding, FIGS. 2 and 3 illustrate violation sequences in which the AMI encoding rules (prohibiting the voltage polarity of adjacent ones from being identical) are violated. The violation sequence illustrated in FIG. 2 is the packet_start_positive violation sequence referred to in Table 2. As is clear from FIG. 2, the adjacent ones designated by reference numeral 56 are both encoded using the same polarity, as are the adjacent ones illustrated by reference numeral 58. Similarly, the violation sequence of FIG. 3 corresponds to the packet_start_negative sequence referred to in Table 2. Again, adjacent ones represented by reference numeral 60 are both encoded with a negative polarity, while adjacent ones designated by reference numeral 62 are both encoded with a positive polarity.

In addition to encoding the external data using alternate mark inversion, the preferred embodiment of the present invention uses binary eight zero substitution (B8ZS) coding to avoid problems with DC drift. In the particular B8ZS coding scheme disclosed herein, each sequence of eight consecutive zero-valued bits of each transport packet are substituted with an AMI violation sequence to increase the transition density. This effectively reduces DC energy, which is undesirable since low frequency information can be lost in systems using transform coupling. If low frequency energy is reduced or eliminated using B8ZS coding, the loss of data can be prevented.

Figure 4:
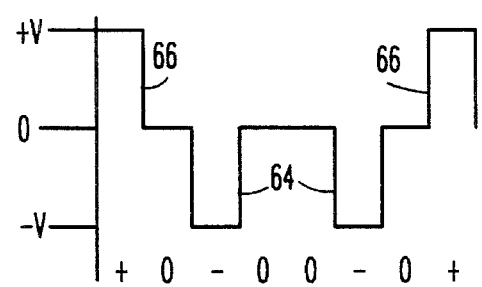
FIG. 4 is a waveform illustrating a third AMI violation sequence.
Figure 5:
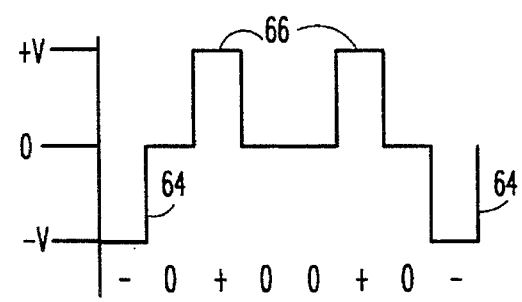
FIG. 5 is a waveform illustrating a fourth AMI violation sequence.

In the present implementation where, for example, 188-byte transport packets are processed, for each sequence of eight consecutive zero-valued bits the zero-valued bits are encoded as one of two violation sequences. For example, if the binary one most recently encoded was encoded as a "+" symbol, then the all zero byte can be encoded with the violation sequence +0−00−0+ as illustrated in FIG. 4. Conversely, if the binary one most recently encoded was encoded as a "−" symbol, then the all zero byte can be encoded with the violation sequence −0+00+0− as illustrated in FIG. 5. In FIGS. 4 and 5, the positive AMI symbols are indicated by reference numeral 66 and the negative symbols are indicated by reference numeral 64.

Prior to AMI encoding, fill bits may be added to each packet in order to form the external data packets (ext_data_packet) as indicated in Table 1. The number of fill bits, which are advantageously binary pseudo-noise (PN) fill bits, depends on the information rate of the currently acquired multiplex. It should be appreciated that this multiplex may typically contain the external data together with other packetized data such as television signal data. Since the number of fill bits required to maintain the fixed output data rate will depend on the information rate, it will also depend on the symbol rate, modulation format and forward error correction coding rate. However, there is no need to keep track of these specifics, as the fill bits can be inserted as required, on a real-time basis, at the encoder. For example, after the external data from a packet has been processed for transmission to the external device, the encoder can provide fill bits until it receives the next packet for formatting and transmission. The receipt of the next packet will be detected when the next packet header arrives. A PN sequence can be generated to produce the fill bits using a four-bit linear feedback shift register (LFSR) as well known in the art.

FIG. 6 illustrates apparatus in accordance with the invention for decoding incoming packets which contain external data received at a variable rate and for reformatting the external data for communication to an external device at a fixed rate. Variable rate data, e.g., from an MPEG-2 or DigiCipher-II data stream, is input to a demodulator 12 via terminal 10. The demodulator demodulates the incoming modulated data stream to recover data packets and clock information which is forwarded to a forward error correction (FEC) decoder 14. The FEC decoder can comprise, for example, a well known Viterbi decoder or any other FEC decoder known in the art.

The FEC decoder 14 provides the packet data, packet start signal and a clock derived from the demodulated data packets to a demultiplexer and data parser 16. This circuit demultiplexes the various different packet types (e.g., video packets, audio packets and data packets) and parses the demultiplexed data packets in a manner well known in the art.

The external packet data output from demultiplexer and data parser 16 is input to a delay circuit 18, which provides a minimum delay of one data byte (e.g., eight bits). The delayed external data is multiplexed in a selector 20 with fill bits from PN generator 26 at the appropriate time to provide fixed length data packets at a fixed data rate. Selector 20 is actuated to output the PN sequence from PN generator 26 instead of the external data from delay circuit 18 by a "select PN/packet data" signal output from timing control generator 24. The timing control generator receives the clock and packet start signals from the demultiplexer and data parser 16. Based on the signals, the timing control generator can actuate selector 20 to output the appropriate number of fill bits at the end of each packet. The timing control generator 24 also outputs an enable signal to the PN generator 26 to actuate the PN generator to output the PN sequence.

The data and PN fill bits output from selector 20 are alternate mark inversion encoded in an AMI encoder 22. The AMI encoded output comprises two-bit symbols representing the ternary (three level) AMI output.

A selector 32 outputs either the AMI encoded data or an AMI violation sequence from B8ZS generator 30. Selector 32 is actuated to output either the AMI encoded data or the violation sequence via a "select B8ZS/AMI data" signal from a zero string detection circuit 28. Upon detecting a string of eight zeros in the AMI encoded data output from AMI encoder 22, circuit 28 will enable B8ZS generator 30 to output the violation sequence while, at the same time, actuating selector 32 to output the violation sequence instead of the string of zeros. Timing control generator 24 inhibits the operation of B8ZS generator 30 via line 40 for the one byte prior to the insertion of a packet start byte in order to prevent the occurrence of a B8ZS AMI violation sequence immediately before the AMI violation sequence used for the packet start byte. In this manner, the packet start byte violation sequence will always take precedence over a B8ZS violation sequence.

The sign (positive or negative) of the last AMI encoded "one" is detected by circuit 34 in order to enable B8ZS generator 30 to insert the correct AMI violation sequence into the data stream output from selector 32. Circuit 34 also advises a packet start byte generator 36 of the polarity of the last AMI encoded "one." In this manner, the packet start byte generator will be able to output the proper AMI violation sequence at the commencement of each new external data packet to be output from the interface. The packet start byte generator 36 receives a start byte enable signal from timing control generator 24. This signal indicates the commencement of a new packet (packet start) and is derived by the timing control generator 24 via the packet start signal output from demultiplexer and data parser 16.

A selector 38 outputs either the AMI encoded data stream from selector 32 or the AMI violation sequence output from packet start byte generator 36, in response to a "select start byte/AMI data" signal from timing control generator 24. As indicated above, the packet start byte will only be output at the beginning of each new external data packet. At all other times, selector 38 will output the AMI encoded data.

The output from selector 38 is communicated via an output port connector (not shown) which may be provided on, for example, a set top box. Any suitable connector may be used, such as a miniature stereo headphone jack, DIN connector, or the like. An external device such as a personal computer, video game or video appliance can be connected to the output port via a mating connector. In this manner, the external device can receive the external data and process it to provide a desired function. For example, the external data may comprise text or graphic information to be reproduced on the external device.

It should now be appreciated that the present invention provides a method for reformatting variable rate data for communication to an external device at a fixed rate. By recovering fixed length packets of the variable rate data from a multiplex of data packets such as an MPEG-2 or DigiCipher-II packet stream, adding a packet start byte to each of the recovered packets, and adding any necessary fill bits, the recovered packets can be output for use by the external device at a fixed rate. AMI and B8ZS encoding provide for a robust operation. Moreover, the fill bits can be easily added to the packets as necessary on a real-time basis to maintain the desired output data rate. In an MPEG-2 or DigiCipher-II implementation, a convenient output rate would be the 27 MHz rate which represents the system time clock of a particular service carried by the multiplex. This output rate would enable the receiver to process the external data without any need to locally generate the system time clock using a program clock reference receiver and phase lock loop circuit.

Although the invention has been described in connection with a specific embodiment, it will be appreciated that numerous adaptations and modifications may be made thereto without departing from the spirit and scope of the invention, as set forth in the claims.

We claim:

1. A method for reformatting variable rate data for communication to an external device at a fixed rate, comprising the steps of:

recovering fixed length packets of said variable rate data from a multiplex of data packets;

adding a packet start byte to the beginning of each of said recovered packets;

adding fill bits to at least some of said recovered packets if an information rate of said variable rate data is less than said fixed rate; and providing said recovered packets with the added packet start byte and any fill bits as an output to said external device at said fixed rate.

2. A method in accordance with claim 1 comprising the further step of:

encoding said recovered packets with the added packet start byte and fill bits prior to said providing step using alternate mark inversion (AMI) and binary eight zero substitution (B8ZS) to provide an encoded data stream for output to said external device.

3. A method in accordance with claim 2 wherein said fill bits are binary pseudo-noise (PN) fill bits.

4. A method in accordance with claim 2 wherein said packet start byte comprises an AMI violation sequence.

5. A method in accordance with claim 4 wherein:

said violation sequence is 0+0+–0–0 when the closest preceding binary "one" to the packet start byte in the AMI encoded data stream is encoded as an AMI "+" value, and said violation sequence is 0–0–+0+0 when the closest preceding binary "one" to the packet start byte in the AMI encoded data stream is encoded as an AMI "–" value, where an AMI "+" value represents a positive differential output voltage, an AMI "–" value represents a negative differential output voltage, and an AMI "0" value represents a differential output of zero volts.

6. A method in accordance with claim 5 wherein said B8ZS encoding replaces a string of eight zeros with an AMI violation sequence.

7. A method in accordance with claim 6 wherein:

said violation sequence used to encode said string of eight zeros is +0–00–0+ when the closest preceding binary "one" to said string in the AMI encoded data stream is encoded as an AMI "+" value, and said violation sequence used to encode said string of eight zeros is –0+00+0– when the closest preceding binary "one" to the packet start byte in the AMI encoded data stream is encoded as an AMI "–" value.

8. A method in accordance with claim 2 wherein said B8ZS encoding replaces a string of eight zeros with an AMI violation sequence.

9. A method in accordance with claim 8 wherein:

said violation sequence is +0–00–0+ when the closest preceding binary "one" to the string of eight zeros in the AMI encoded data stream is encoded as an AMI "+" value, and said violation sequence is –0+00+0– when the closest preceding binary "one" to the string of eight zeros in the AMI encoded data stream is encoded as an AMI "–" value, where an AMI "+" value represents a positive differential output voltage, an AMI "–" value represents a negative differential output voltage, and an AMI "0" value represents a differential output of zero volts.

10. Apparatus for reformatting variable rate data for communication to an external device at a fixed rate, comprising:

a decoder for recovering fixed length packets of said variable rate data from a multiplex of data packets;

an encoder for adding a packet start byte to the beginning of each of said recovered packets;

said encoder also adding fill bits to at least some of said recovered packets when an information rate of said variable rate data is less than said fixed rate; and an output port coupled to said encoder for providing said recovered packets with the added packet start byte and fill bits to said external device at said fixed rate.

11. Apparatus in accordance with claim 10 wherein:

said encoder encodes said recovered packets with the added packet start byte and fill bits using alternate mark inversion (AMI) and binary eight zero substitution (B8ZS) to provide an encoded data stream for output to said external device.

12. Apparatus in accordance with claim 11 wherein said packet start byte comprises an AMI violation sequence.

13. Apparatus in accordance with claim 12 wherein said B8ZS encoding replaces a string of eight zeros with an AMI violation sequence.

14. Apparatus in accordance with claim 11 wherein said B8ZS encoding replaces a string of eight zeros with an AMI violation sequence.

* * * * *